United States Patent [19]
Keck

[11] 3,992,688
[45] Nov. 16, 1976

[54] ROTARY ARMATURE SOLENOID

[75] Inventor: Erich Keck, Fuerstenfeldbruck, Germany

[73] Assignee: Siemens Aktiengesellschaft, Berlin & Munich, Germany

[22] Filed: Aug. 20, 1975

[21] Appl. No.: 606,175

[30] Foreign Application Priority Data
Aug. 23, 1974 Germany............................ 2440566

[52] U.S. Cl................................. 335/272; 310/36
[51] Int. Cl.²........................................... H01F 7/08
[58] Field of Search ................ 310/36, 38; 335/272

[56] References Cited
UNITED STATES PATENTS

| | | | |
|---|---|---|---|
| 2,364,656 | 12/1944 | Price................................. | 335/272 |
| 3,827,543 | 8/1974 | Kawano et al..................... | 335/272 |

*Primary Examiner*—Harold Broome
*Attorney, Agent, or Firm*—Hill, Gross, Simpson, Van Santen, Steadman, Chiara & Simpson

[57] ABSTRACT

A rotary solenoid, particularly for use in electronic teleprinters and the like, especially for attachment perforators, etc., in which most of the metal components may be fabricated in the form of stamped sheet metal structures rather than turned or machined components and which is relatively readily adaptable to automatic fabrication, the stator poles being in the form of stamped sheet metal laminations disposed in respective aligned stacks at opposite ends of an actuating coil and provided with respective bearing members, for the armature, disposed at the outer faces of the respective pole stacks, with each bearing member having an inwardly directed bearing boss extending into the adjacent stack and in engagement with the respective pole faces thereof to axially align the armature in operative position. The respective pole stacks are operatively connected by a pair of yoke plates, likewise formed as sheet metal stampings and extending between and connecting the respective pole stacks to effect a closing of the magnetic circuit of the rotary solenoid.

7 Claims, 1 Drawing Figure

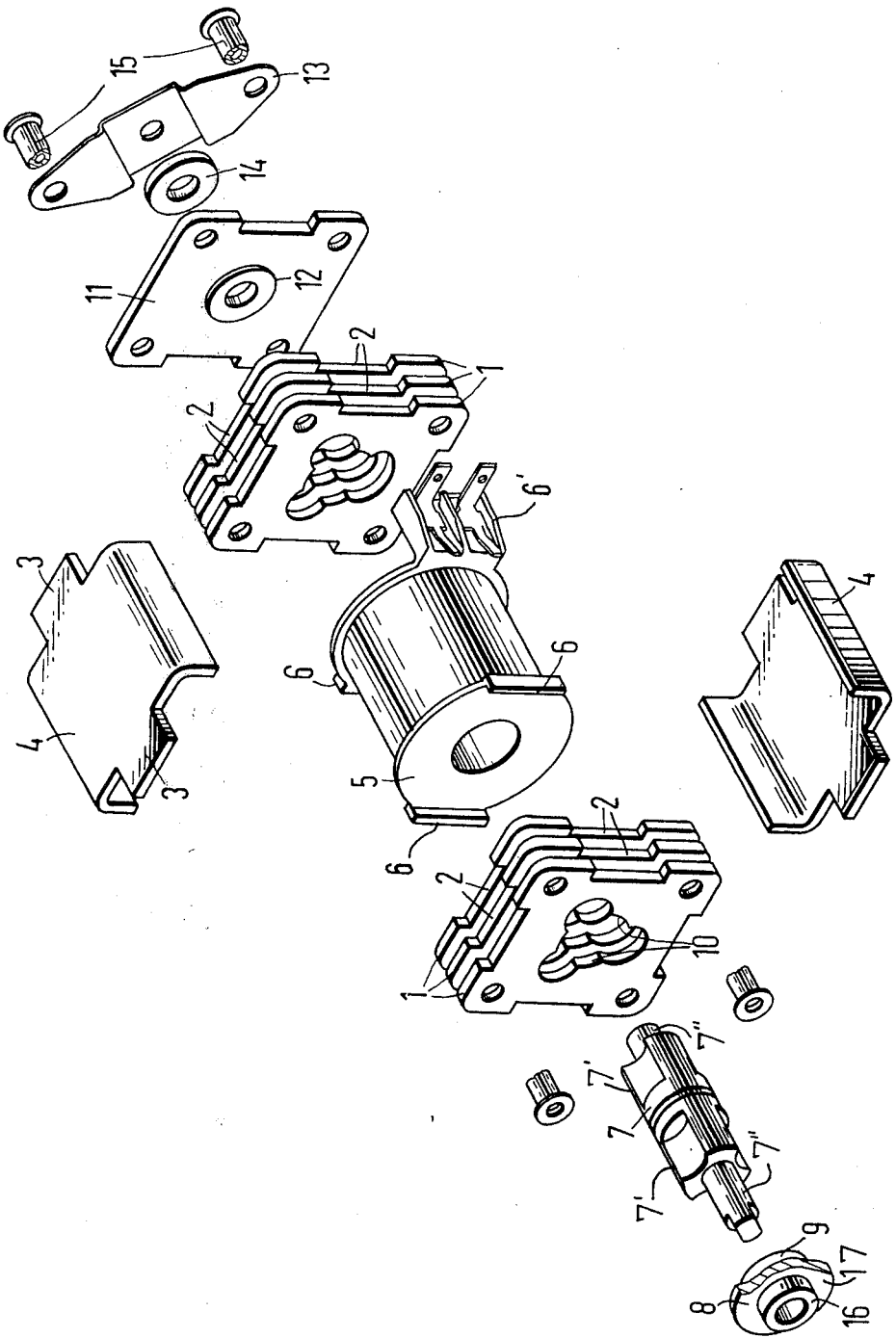

ROTARY ARMATURE SOLENOID

BACKGROUND OF THE INVENTION

The invention relates to a rotary solenoid having a substantially cylindrical armature, the effective pole faces of which are disposed adjacent the respective ends of the armature, with the latter being adapted to be attached to a drive shaft for actuation thereby.

In electronic teleprinters and the like, the drive to the perforator and feed mechanism of an attachment perforator cannot be taken directly from the teleprinter itself, and as a result thereof, with this type of equipment the attachment perforator must be provided with special drive arrangements. In this context, such drive arrangements must, in particular, be matched to the intermittent motions produced in the operation of the punches and during the feed motion, whereby the drive should be such that it can be brought into operation at any time and has a short access time.

These conditions are met, in a particularly advantageous manner, by the utilization of rotary solenoids as the drive mechanisms. Consequently, the utilization of rotary solenoids has been proposed in which such a solenoid is provided for each punch and for the feed mechanism, the solenoid usually actuating a bell crank lever in opposition to the force of a spring.

Known rotary solenoids, for example, of type manufactured by the Harting firm, under the designation of No. 500, employ a cylindrical stator housing containing a coil in which a cylindrical armature is disposed, the effective pole faces of the housing being adjacent the ends of the armature, which in turn is attached to drive shaft. The latter is carried in bearing plates at the ends of the stator housing, the bearing plates themselves being attached to the stator housing by dowel screws. All parts, with the exception of the coil, involve machined, i.e. turned components, as a result of which the manufacture thereof is very expensive.

As the available torque in rotary armature solenoids is closely dependent upon the size of the air gap, effort is made in the design of such type of solenoids to keep such air gaps as small as possible. However, it will be appreciated that there are limits with respect to the extent to which this can be realized in practice, as a result of armature bearing tolerances. Consequently, it has heretofore been considered that the requisite accuracy could be achieved only by the use of machined, i.e. turned components.

BRIEF SUMMARY OF THE INVENTION

The present invention has as its objective the production of a rotary solenoid, having extremely small working air gaps, for use as the drive of feed mechanisms and punches in a teleprinter perforator, which solenoid can be manufactured relatively very inexpensively without the requirement for machining operations, and at the same time can be readily employed to form matrix-type drive units.

In accordance with the invention this objective is realized by the utilization of stator poles consisting of pole laminations in the form of sheet metal elements produced by stamping or punching operations, with the laminations being arranged in respective stacks and the bearing members for the armature shaft or spindle being provided with bosses or hubs which extend into at least the adjacent outer pole lamination, and are engaged with, and axially aligned by the internal pole faces of the lamination.

In one advantageous embodiment, at least one of the bearing members is designed as a stamped structure, whose peripheral configuration matches that of the pole laminations, with such bearing member having the alignment boss formed thereon by a stamping operation to offset material of the sheet metal plate, forming the boss, out of the plane of such lamination.

A solenoid constructed in accordance with the invention has the particular advantage that it can be produced extremely, inexpensively by the use of stamped components. Further, as a result of the particular bearing design, in association with the stamped components, a very small working area can be achieved with resulting very high efficiency. As a result of the symmetrical design of the individual components, automatic assembly largely can be utilized.

A further important advantage is the optimum exploitation of the compact, relatively low volume of the structure, enabling high packing density of a plurality of matrix-type solenoid systems arranged side by side and one above the other.

In a further advantageous embodiment of the invention, at least one of the bearing members is constructed as a solid of rotation and is formed with two axial bosses separated by a larger flange with one of the bosses forming the bearing boss engaged with the adjacent pole lamination, while the other boss is designed to provide centering means, by means of which the solenoid may be accurately positioned and mounted in a housing plate or the like.

The last mentioned construction of bearing member has the further advantage in that it enables the simple and easy changing of the solenoid armature without the need for any press fits and thus any pressure installation or removal operations. The flange formed on the bearing member largely prevents axial play in the armature and as a result of the second boss enables simple and easy installation of the structure into a housing frame or the like. Likewise, in view of the presence of the second boss, additional centering or aligning means between the solenoid and a housing or other supporting structure is superfluous.

BRIEF DESCRIPTION OF THE DRAWING

In the drawing the FIGURE illustrates an exploded view of a rotary solenoid constructed in accordance with the invention.

DETAILED DESCRIPTION OF THE INVENTION

The rotary solenoid illustrated includes a stator pole structure which is constructed of pole laminations 1, readily produced by stamping or punching operations, each of which contains a plurality of recesses 2 at corresponding edges. The laminations are assembled in stacked relation to form two stacks which are operatively connected by a pair of yoke plates 4, which likewise can be readily produced in the form of stampings or punchings, with each of the yoke plates having respective tongue-like projections 3 on opposite ends thereof whereby each of the yoke plates may operatively connect the respective lamination stacks with the projections 3 on the plates disposed in the recesses 2 of the laminations. Disposed between the respective stacks of pole laminations, and partially enclosed by the yoke plates 4, is an actuating coil 5 which may be in the form of a plastic injection-molded member which carries the actuating winding and is provided with projections 6 thereon extending into adjacent recesses 2 on the respective stacks of pole laminations, whereby the actuating coil is effectively secured with respect to relative rotation between it and the stator structure. As illustrated, one projection 6' on the plastic spool structure may be enlarged to carry electrical terminal connections for the solenoid winding. Operatively disposed in the actuating coil 5 is a three-pole armature 7, provided with pole portions 7' and shaft portions 7", which is rotatably mounted at its forward end in a bearing member 8, which is illustrated as being formed as a machined piece, in a turned piece, which is provided with two bosses 9 and 16 separated by an intermediate larger flange 17, the boss 9 being complemental to the pole faces 10 of the pole laminations whereby such boss may be inserted therein to directly engage such faces and thus precisely center the member 8, and with it the armature relative to the laminations. The second boss 16 makes it possible to mount the rotary solenoid directly into complemental apertures in a matrix-type housing plate, not shown, whereby the solenoid can be accurately positioned without the provision of an additional centering or aligning structure, and without the armature jamming or being subjected to any axial pressure.

The other bearing member for the armature 7 is in the form of a bearing plate 11 having a central boss 12 thereon, the material forming the same being offset out of the plane of the member 11, which thus can be readily produced by a stamping operation or the like. At the outer side of the bearing plate 11 is provided a bracket 13 which is adapted to retain a lubricating felt washer 14. The assembled structure can be secured in such assembled relation by rivets 15 passing through apertures in the respective laminations, bearing plate and bracket. It will be appreciated that the structure can be assembled largely automatically and, as a result of extensive use of stampings in its production, can be very economically produced.

Having thus described my invention it will be obvious that although various minor modifications might be suggested by those versed in the art, it should be understood that I wish to embody within the scope of the patent granted hereon all such modifications as reasonably, and properly come within the scope of my contribution to the art.

I claim as my invention:

1. A rotary solenoid with a cylindrical armature having its effective pole faces respectively disposed adjacent the ends thereof, comprising a hollow actuating coil, stator poles respectively having a plurality of pole laminations formed from sheet metal and disposed in respective aligned stacks at opposite ends of the actuating coil, respective bearing members for the armature shaft disposed at the outer faces of the respective pole stacks, each bearing member having an inwardly directed bearing boss thereon, extending into the adjacent stack with the respective bosses being engageable with and axially aligned in operative position by the internal pole faces of the adjacent pole lamination, and means for retaining the coil and pole laminations in assembled relation.

2. A rotary solenoid according to claim 1, wherein at least one of said bearing members is formed as a solid of rotation and provided with a pair of oppositely disposed bosses thereon separated from one another by a flange of greater diameter, the inner one of such bosses forming one of said bearing bosses engageable with the adjacent internal pole faces of the adjacent pole lamination, and the other boss providing a centering bush by means of which the structure can be operatively aligned on a supporting structure.

3. A rotary solenoid according to claim 1, wherein yoke plates formed of sheet metal are provided, which carry tongue-like projections at their respective ends, the respective stacks of stator pole laminations having cooperable recesses therein, in which said yoke projections are disposed, with said yoke plates closing the magnetic circuit of the rotary solenoid.

4. A rotary solenoid according to claim 1, wherein at least one of the bearing members of the stator structure is in the form of a sheet-like element having a peripheral configuration corresponding substantially to that of the stator pole laminations, with the bearing boss thereon being formed by an offset of the sheet material transverse to the plane thereof.

5. A rotary solenoid according to claim 4, wherein yoke plates formed of sheet metal are provided, which carry tongue-like projections at their respective ends, the respective stacks of stator pole laminations having cooperable recesses therein, in which said yoke projections are disposed, with said yoke plates closing the magnetic circuit of the rotary solenoid.

6. A rotary solenoid according to claim 4, wherein at least one of said bearing members is formed as a solid of rotation and provided with a pair of oppositely disposed bosses thereon separated from one another by a flange of greater diameter, the inner one of such bosses forming one of said bearing bosses engageable with the adjacent internal pole faces of the adjacent pole lamination, and the outer boss forming a centering bush by means of which the structure can be operatively aligned on a supporting structure.

7. A rotary solenoid according to claim 6, wherein yoke plates formed of sheet metal are provided, which carry tongue-like projections at their respective ends, the respective stacks of stator pole laminations having cooperable recess therein in which said yoke projections are disposed, with said yoke plates closing the magnetic circuit of the rotary solenoid.

* * * * *